C. E. DUNLAP

Nov. 11, 1930. INNER TUBE PATCH Re. 17,859

Original Filed Jan. 7, 1929

Inventor

Clarence E. Dunlap

By Lynn H. Latta Attorney

Reissued Nov. 11, 1930

Re. 17,859

UNITED STATES PATENT OFFICE

CLARENCE E. DUNLAP, OF SIOUX CITY, IOWA

INNER-TUBE PATCH

Original No. 1,756,183, dated April 29, 1930, Serial No. 330,820, filed January 7, 1929. Application for reissue filed September 8, 1930. Serial No. 480,605.

My invention relates to inner tube patches of the preformed type, that is, the type in which individual patches are cut or shaped in the factory so as to be substantially ready for use on being removed from their package.

My invention further relates to a preformed patch of the type having a layer of uncured rubber for adhesion to the surface of an inner tube, a layer of protective fabric covering the face of said uncured layer and a layer or layers of cured rubber forming a backing for the layer of uncured rubber.

My invention further relates to a preformed patch of the above described variety having its edges or edge bevelled in order to render the patch more secure against peeling after it has adhered to the surface of a tube.

The purpose of my invention is to provide a patch of the above mentioned type in which the layer of uncured rubber will be protected for a maximum length of time against drying out or air curing.

More particularly, it is my object to provide such a patch in which the uncured layer is protected from drying out from above.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
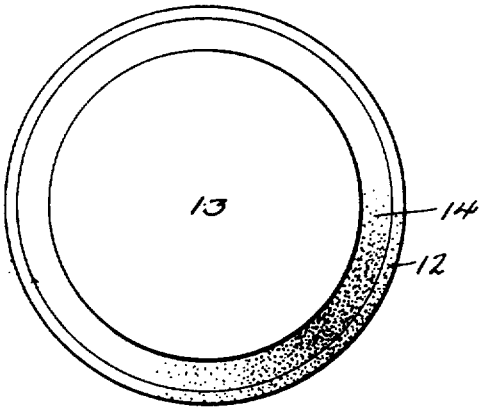
Fig. 1 is a plan view of a patch embodying my invention.
Figure 2:
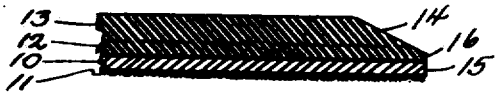
Fig. 2 is an enlarged, sectional view through one edge of the patch.

I have used the reference character 10 to indicate the layer of uncured rubber of the patch. The adhesive face of this layer is protected by fabric 11 and the opposite face is united with a layer of cured rubber 12.

The patch illustrated which is the patch sold commercially is in actuality a four-ply patch, the upper layer 13 being a thick layer and substantially twice the thickness of the layer 12.

My invention consists in forming the patch with a bevel 14 and a square cut 15, which meets the bevel 14 at about the center of thickness of the layer 12. Thus a very thin but substantial shoulder of cured rubber is formed to completely cover from above the layer 10 of uncured rubber. This shoulder is indicated in the drawings by the reference character 16.

In that type of patch in which the bevel is carried entirely to the adhesive face of the uncured layer, the adhesive layer will dry out from above, owing to the extreme thinness of the material at the edge of the patch. In my patch, the only exposure of the uncured layer of rubber is at the edge and since this edge is perpendicular, it is of minimum area as compared with a bevelled face.

Figure 3:
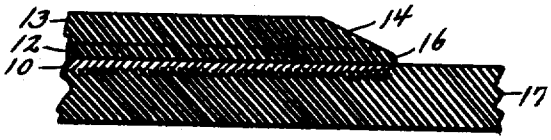
Fig. 3 is a similar sectional view through the patch adhering to an inner tube.

When the patch is united with a tube, the layer of uncured rubber is absorbed into the material of the tube so as to leave only the shoulder 16 projecting from the surface of the tube. This is illustrated in Fig. 3. Thus only the very narrow width of the shoulder 16 will be left projecting above the tube after the patch is in place. The effectiveness of the bevelled face 14 in protecting the patch against peeling will not be impaired by this projecting shoulder. The tube is indicated by the reference character 17.

Some changes may be made in the construction and arrangement of the parts of my invention without departing from the real spirit and purpose thereof, and it is my intention to cover by my claims, any modified forms of structure or the use of mechanical equivalents, which may reasonably be included within their scope.

I claim as my invention:

1. An inner tube patch of preformed shape, comprising a layer of uncured rubber, a layer of protective fabric adhering to the adhesive face thereof, and a layer of cured rubber united with the rear face thereof, the edge of the cured layer being bevelled through a majority of its thickness, and the remainder of its thickness, together with all of the uncured layer and the fabric, being cut off squarely to leave a shoulder of cured rubber completely covering the rear face of the uncured layer.

2. An inner tube patch of preformed shape, comprising a layer of uncured rubber, a layer of protective fabric adhering to the adhesive face thereof, and a layer of cured rubber united with the rear face thereof, an edge of the cured layer being bevelled through a majority of its thickness, and the remainder of its thickness, together with all of the uncured layer and the fabric, being cut off squarely to leave a shoulder of cured rubber completely covering the rear face of the uncured layer.

Signed this sixth day of September, 1930, in the county of Woodbury and State of Iowa.

CLARENCE E. DUNLAP.